United States Patent Office 3,537,649
Patented Nov. 3, 1970

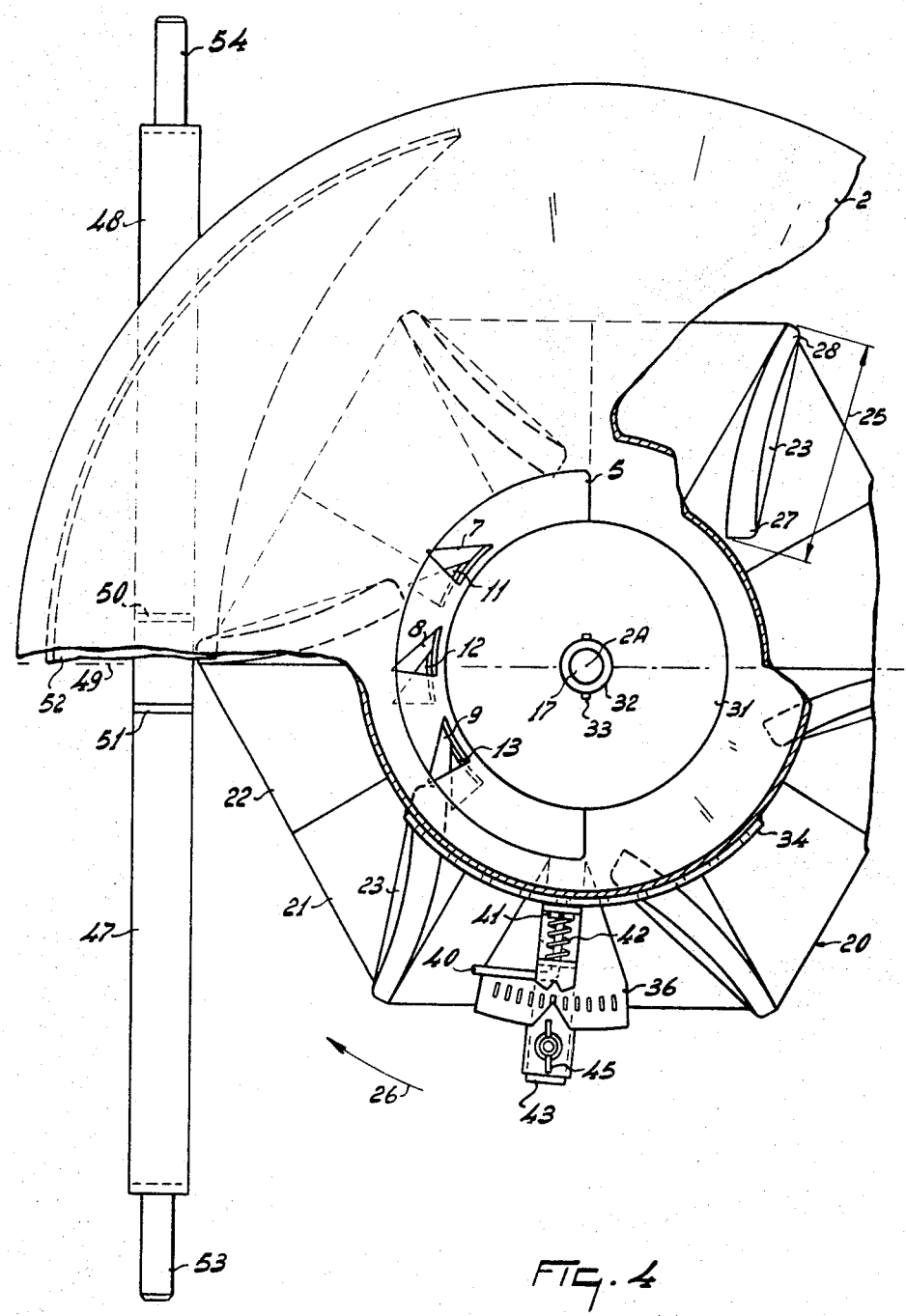

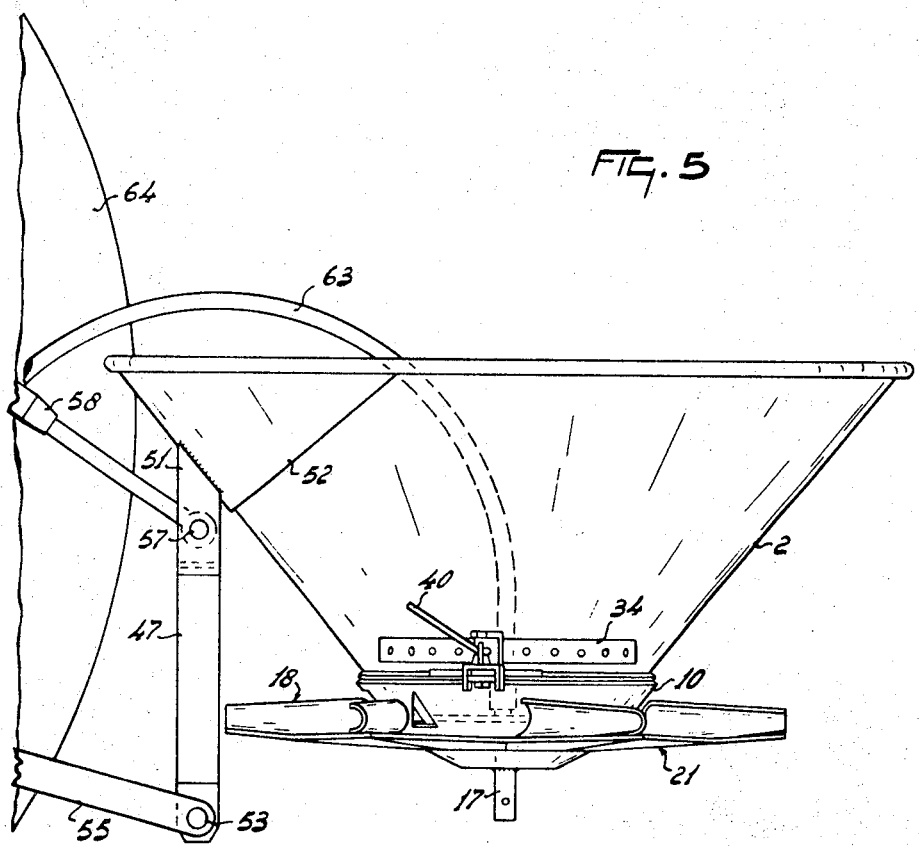

3,537,649
SPREADING IMPLEMENTS
Cornelis van der Lely, 7 Bruschenrain, Zug, Switzerland, and Hendricus Jacobus Cornelis Nieuwenhoven, Baar, Switzerland
Filed Feb. 9, 1968, Ser. No. 704,343
Claims priority, application Netherlands, Feb. 20, 1967, 6702499
Int. Cl. A01c 17/00
U.S. Cl. 239—666
22 Claims

ABSTRACT OF THE DISCLOSURE

A spreader with a hopper and a rotary spreading member supported at the bottom of the hopper. An outlet member at the bottom of the spreader has ports which can be placed in or out of register with corresponding ports of a masking member. A power take-off can be connected to the shaft for rotating the spreading member. The spreading member is a segmented disc with curved upright blades.

This invention relates to spreading implements, such implements being of the kind comprising a frame movable over the ground, a hopper with at least one outlet port supported by the frame and a spreading member for material contained in the hopper.

An object of the invention is the provision of a simple and effective implement that is particularly, but not exclusively, suitable for use in the spreading of seeds.

According to the invention, there is provided an implement of the kind set forth, wherein the spreading member is arranged at the bottom of the hopper and is supported only by the bottom of the hopper.

Figure 1:
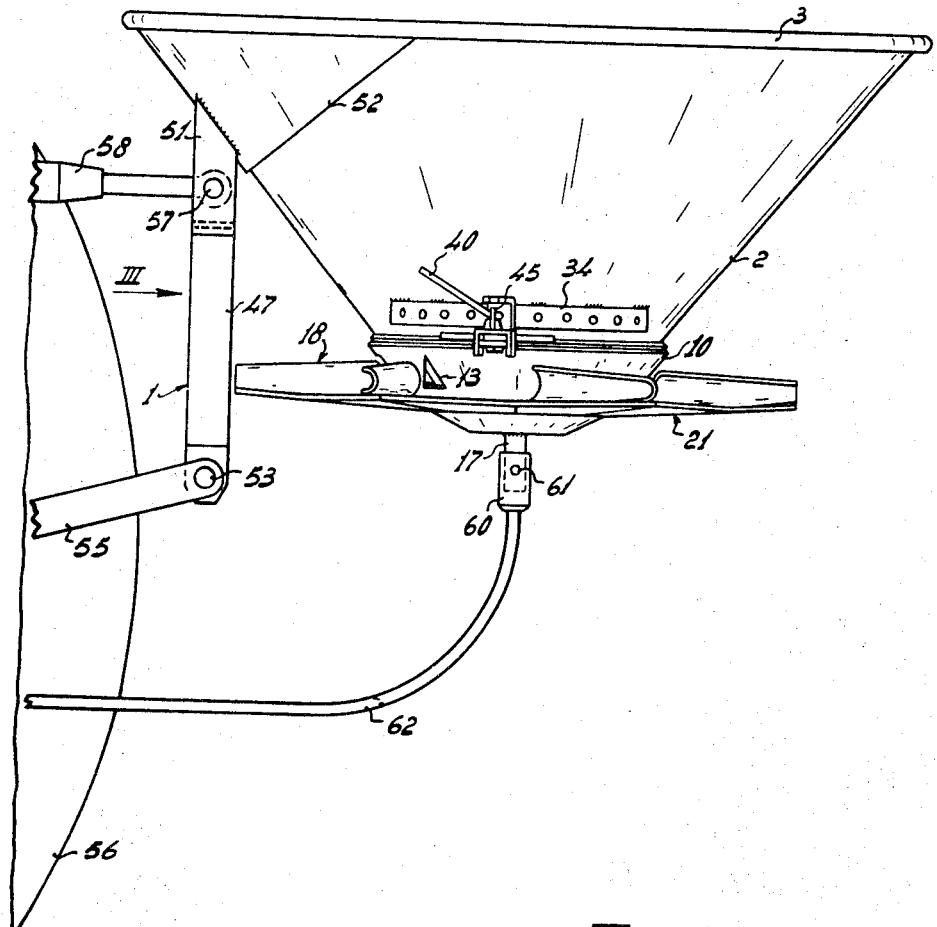
Figure 2:
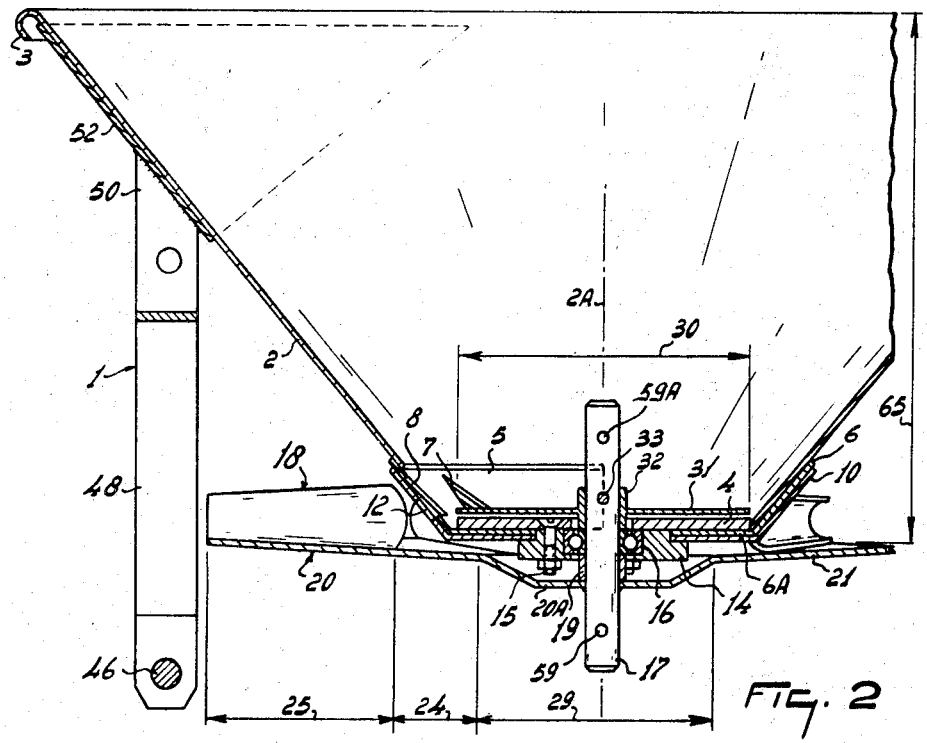

For a better understanding of the invention, and to show how the same may be carried into effect, reference will now be made, by way of example, to the accompanying drawings, in which:

FIG. 1 is a side elevation of a spreading implement in accordance with the invention mounted on the three-point lifting device or hitch of an agricultural tractor, FIG. 2 is a vertical section, to an enlarged scale, showing the construction of the implement of FIG. 1 in greater detail, FIIG. 3 is a front view of part of the implement, to an enlarged scale, as seen in the direction indicated by the arrow III of FIG. 1, FIG. 4 is a part-sectional plan view of the implement, and FIG. 5 corresponds to FIG. 1 but shows an alternative working arrangement.

Referring to the drawings, the spreading implement which is illustrated has a frame that is generally indicated by the reference 1 and to which a hopper 2 of inverted conical form is secured. The upper edge of the hopper 2 has an outwardly bent-over rim 3. The hopper 2 has a bottom 4 in the form of an annular plate which is of greater thickness than the material of the hopper wall and which is rigidly secured to the latter. A slot-shaped outlet port 5 is formed in the conical side wall of the hopper 2 immediately above the bottom 4 thereof, said outlet port 5 subtending an angle of about 180° at the substantially vertical axis 2A of the hopper 2. A lower region of the hopper is surrounded by a dished outlet member 6 the bottom 6A of which engages the bottom 4 of the hopper 2 at the lower side of the latter. The outlet member 6 has a frusto-conical wall having the same angle of conicity as the wall of the hopper 2. The member 6 is formed with three outlet ports 7, 8 and 9, each port being of right-angled triangular configuration and having a lower edge (not the hypotenuse of the triangle) which is approximately coplanar with the upper surface of the bottom 4 of the hopper.

A masking member 10 of substantially the same configuration as the outlet member 6 bears against said outlet member at the lower side of the latter. The frusto-conical wall of the masking member 10 is also formed with three outlet ports 11, 12 and 13 that are of the same size, shape and relative spacing as the outlet ports 7, 8 and 9 of the member 6. The bottom 6A of the outlet member 6 and the bottom of the masking member 10 are sandwiched between the bottom 4 of the hopper 2 and a shouldered fastening ring 14 which is rigidly connected to said bottom 4 by vertically extending bolts 15. A ball bearing 16 is located in the central opening of the ring 14 and the inner race of said ball bearing surrounds a substantially vertically disposed rotary shaft 17 whose longitudinal axis is coincident with the previously mentioned axis 2A.

A spreading member that is generally indicated by the reference 18 is secured to the shaft 17 beneath the fastening ring 14, a spacing sleeve 19 surrounding the shaft 17 between the bottom of the ring 14 and a disc-shaped central region 20A of a base plate 20 of the spreading member 18, which disc-shaped region 20A is contained in a plane extending perpendicular to the axis 2A. The flat disc-shaped region 20A is integrally surrounded by an upwardly divergent frusto-conical region the upper edge of which merges into twelve segments 21 which together afford the greater part of the base plate 20. The segments 21 are so shaped that, in plan view (FIG. 4) the base plate 20 is of generally hexagonal configuration having six outer edges 22. However, each pair of segments 21 which, in plan view, share a single edge 22 are gently inclined to one another at the approximately radial junction between them in such a way that this junction is located at a lower level than the junction between two segments 21 which do not share a common edge 22, the last-mentioned junction terminating in one of the points of the hexagon. It will thus be apparent that, although each segment 21 is gently inclined to both its neighbors, that part of the whole of the base plate 20 which surrounds the dished center including the region 20A is of somewhat corrugated configuration, the junctions between the relatively inclined segments 21 that afford the corrugations all extending substantially radially.

The spreading member 18 has six ejecting blades 23 which are of curved configuration when seen in the direction of the axis 2A (FIG. 4). Each blade 23 has an outer end 28 located at a corresponding point of the approximately hexagonal base plate 20 and a root end 27 located at a distance 24 (FIG. 2) from the radially inner edge of the corresponding segment 21. The distance 24 is equal to approximately half the length 25 (FIG. 4) of each blade 23. The root 27 of each blade 23 is located further forwardly with respect to the intended direction of rotation 26 (FIG. 4) of the ejecting member 18 than is its radially outer end 28. The diameter 29 of the whole central dished part of the base plate 20 of the spreading member 18 is less than the diameter 30 of the annular disc affording the bottom 4 of the hopper 2, said diameter 30 preferably having a magnitude of about 18 centimeters. Each blade 23 is C-shaped when viewed in its longitudinal direction, the lowermost edge of the C being secured to one of the segments 21 with the concave side of the C facing forwardly with respect to the direction 26. A radially outermost portion of each blade 23 which terminates in its outer end 28 extends approximately radially with respect to the axis 2A.

A disc 31 has a hub 32 which surrounds the shaft 17 above the ball bearing 16 and which is secured to said shaft with the aid of a transverse pin 33. The disc 31 has the same diameter 30 as the bottom 4 of the hopper 2 and is disposed immediately above said bottom so as to extend parallel thereto. The short distance between the disc 31 and the bottom 4 of the hopper 2 is preferably about 2 millimeters. A strip-shaped locating member 34 formed with a row of holes 35 is fastened to the outer surface of the frustoconical wall of the hopper 2 and the outlet member 6 has a projecting adjusting arm 36 fastened to it, said arm 36 being formed with two upwardly projecting parts 37 and 38 in which the shank of a substantially horizontal locking pin 39 is entered. The tip of the locking pin 39 is urged into engagement with the locating member 34 by a helical compression spring 42 which surrounds said pin between the part 38 and a collar 41 fastened to the pin. The locking pin 39 has a handle 40 and the part 38 of the arm 36 has a horizontally bent-over end formed with a notch (visible in FIG. 4 of the drawings) with which said handle 40 can be engaged, when required, to retain the locking pin 39 in a retracted position, against the action of the spring 42, in which position its tip cannot enter any one of the holes 35. A second adjusting arm 43 is arranged immediately beneath the arm 37 and has radially inner end secured to the masking member 10. A clamp 44 is mounted at the radially outermost end of the second adjusting arm 43 and has a pointer which overlies the broadened radially outer end of the adjusting arm 36, said end being formed with a scale which can be seen in FIG. 4 of the drawings. The clamp 44 includes a wing nut 45 which can be tightened to retain the two adjusting arms 36 and 43 in any one of a number of different relative angular settings, said settings being indicated by the co-operating pointer and scale which have just been mentioned.

Figure 3:
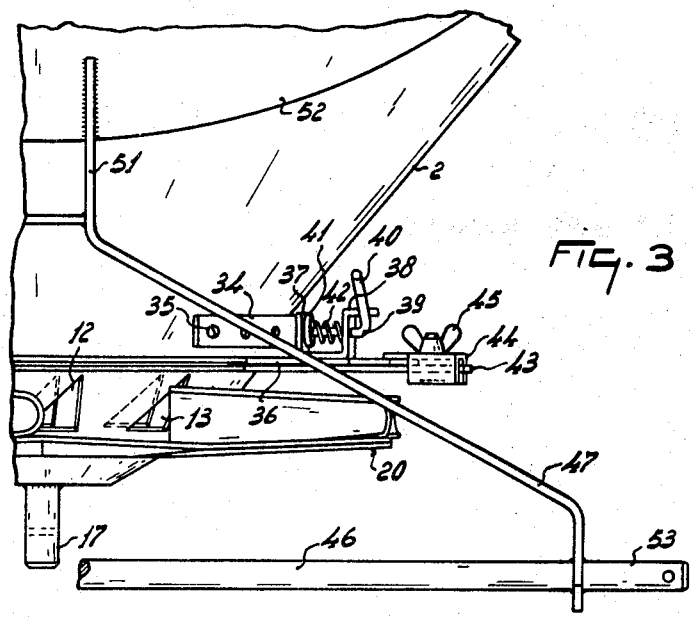

The frame 1 of the implement includes a horizontal shaft 46 to the opposite ends of which two upwardly directed strips 47 and 48 are secured. The strips 47 and 48 are symmetrical to one another and to a substantially vertical plane 49 (FIG. 4) which contains the axis 2A and extends perpendicular to the shaft 46. The shape of the strip 47 can be seen in FIG. 3 of the drawings. The uppermost ends of the two strips 47 and 48 take the form of vertical portions 50 and 51, these portions being rigidly secured at their upper ends to a curved stiffening plate 52 which embraces an upper edge region of the hopper 2 and which is rigidly secured to the latter. The opposite ends of the shaft 46 project beyond the strips 47 and 48 and afford horizontally aligned pins 53 and 54 intended for connection to the free ends of the lower lifting links 55 of an agricultural tractor 56 or other vehicle as shown in FIG. 1. The vertical portions 50 and 51 of the strips 47 and 48 are formed with horizontally aligned holes 57 through which a pin is entered to connect them to the free end of the upper adjustable lifting link 58 of said three-point lifting device or hitch.

The shaft 17 projects from the bottom of the central region 20A of the spreading member 18 and is formed with a transverse hole 59. A socket 60 carried at one end of a flexible driving shaft 62 can be slipped over the lowermost end of the shaft 17 and connected to the latter with the aid of a transverse pin 61 entered through the hole 59 and through holes in the wall of the socket 60. The opposite end of the flexible driving shaft 62 is placed in driven connection with the power take-off shaft of the agricultural tractor or other vehicle 56.

The implement may be employed to spread material over the ground such as seeds, fertilizers, insecticides, sand, lime or other chemicals and, when it is to be used, it is secured to the three-point lifting device or hitch of the tractor or other vehicle 56 in the manner which can be seen in FIG. 1 of the drawings. As the tractor 56 moves over the ground, the flexible driving shaft 62 causes the spreading member 18 to rotate in the direction 26 thus spreading any material which reaches the blades 23 from the hopper 2 through the outlet port 5, the outlet ports 7, 8 and 9 and the outlet ports 11, 12 and 13.

The outlet ports 7, 8 and 9 in the member 6 can be opened to a desired extent by bringing the ports 11, 12 and 13 in the masking member 10 into register therewith to a greater or lesser degree. This adjustment is effected by moving the adjusting arms 36 and 43 relative to one another and subsequently tightening the wing nut 45 to cause the clamp to maintain the selected adjustment setting.

The position of the strip of ground upon which material ejected by the spreading member 18 falls is determined principally by the angular position around the axis 2A at which material from the hopper 2 actually reaches the spreading member 18. An adjustment to this end is effected by moving the outlet member 6 and masking member 10 together about the axis 2A upon withdrawing the locking pin 39 from one of the holes 35 in the locating member 34. When the locking pin 39 has been brought into register with an appropriate fresh hole 35, its tip is allowed to enter the same and the direction in which the material is ejected from the implement will have been changed accordingly. It will be noted that, provided no alteration is made in the relative setting of the two adjusting arms 36 and 43, the rate of supply of the material from the hopper 2 to the spreading member 18 will not be changed by the adjustment which has just been described. Since both the adjusting arms 36 and 43 are arranged at one lateral side of the hopper 2 and the frame 1 of the implement is located substantially wholly at its front, the various adjustments of the members 6 and 10 which are possible with respect to one another and to the hopper 2 can be made without difficulty.

The implement which has been described is particularly suitable for use in the spreading of seeds since the triangular shapes of the outlet ports 7 to 9 and 11 to 13 are such that settings can be arrived at in which very small weights of seed per acre can be spread without the seed jamming in the outlet ports. The conical shape of the wall of the hopper 2 and the shapes of the various ports 5, 7, 8, 9, 11, 12 and 13 are such that seeds or other material can reach the spreading member 18 with a minimum likelihood of blockage. All of the ports have just been mentioned are located internally of a circle containing the root ends 27 of all of the blades 23 and all, or major portions, of the ports 11 to 13 are situated at lower levels than the upper edges of the blades 23 at the ends 27 of the latter. This ensures that substantially all of the material passing through the outlet ports 11 to 13 is effectively engaged and ejected by the blades 23. The disc 31 rotates with the spreading member 18 thus tending to throw any material lying thereon radially outwardly from the axis 2A towards the outlet port 5.

Since the implement is intended primarily, but not exclusively, for the spreading of seeds, the capacity of the hopper 2 need not be large since, generally speaking, the weight of seeds per acre which must be spread is quite low. Consequently, the hopper 2 can be completely supported from an upper part of the frame 1 (i.e. the stiffening plate 52) and the whole implement can be supported from the three-point lifting device or hitch of a vehicle such as the tractor 56 shown in FIG. 1 of the drawings. In the illustrated embodiment, the hopper 2 has a height 65 (FIG. 2) of about 32 centimeters and a top diameter of about 70 centimeters. The spreading member 18 is completely supported by the bottom 4 of the hopper 2 and these various features all lead to simplicity of shape of the various parts of the implement so that it can be manufactured quickly and easily.

Instead of being driven from its lowermost end as shown in FIG. 1 of the drawings, the shaft 17 may be driven from its uppermost end as shown in FIG. 5. As can be seen in FIG. 2 of the drawings, the uppermost end of the shaft 17 projects well above the hub 32 and is formed with a transverse hole 59A intended to co-operate with a socket 60 and a transverse pin 61 in the same manner as has been described with reference to FIG. 1 of the drawings. However, in this case, the socket is carried at the end of a flexible driving shaft 63 which is arched upwardly over the rim 3 of the hopper 2 between the upper end of the shaft 17 and the power take-off shaft of an agricultural tractor 64 or other vehicle. Due to the shape of the ejecting blades 23, it is most desirable that the spreading member 18 should always be rotated in the direction 26 (FIG. 4). Accordingly, if the shaft 17 is to be driven in both of the two ways which have been described with reference to FIGS. 1 and 5 of the drawings, the power take-off shaft of the tractor 56 or 64 or other vehicle should be one which can be rotated in either direction. Alternatively, a simple "reverse" gear box may be provided with the implement for use with tractors or other vehicles in which the power take-off shaft can rotate in only one direction. Some agricultural tractors have two power take-off shafts which rotate in relatively opposite directions and, obviously, the correct shaft must be chosen under these circumstances. It is noted that it is within the scope of the invention to provide a spreading member having substantially radially disposed blades of a form which is such that they will effectively eject material from the hopper 2 whichever direction of rotation is imparted to the shaft 17. It is also within the scope of the invention to provide a shaft 17 which can only be rotated from one end or the other (i.e. the lower end or the upper end).

When the shaft 17 is driven from the lower end as shown in FIG. 1 of the drawings, the spreading member 18 will be located at a greater distance above the ground surface than when it is driven from the upper end as shown in FIG. 5 of the drawings. With the latter arrangement, the spreading member 18 is preferably located at a distance of about 35 centimeters above the ground surface and this is advantageous for the distribution of seeds. When the implement is arranged as shown in FIG. 1 of the drawings, its spreading member 18 is located at a distance of about 72 centimeters above the surface of the ground and this setting is generally better for the distribution of insecticides and other pesticides.

Having thus described our invention, what we claim as new and desire to secure by Letters Patent of the United States is:

1. A spreader implement comprising a frame and a hopper with a bottom mounted on said frame, a rotatable spreading member mounted on a shaft adjacent the bottom of said hopper, said shaft and said spreading member being entirely supported by the bottom of said hopper, an outlet port in said hopper adjacent the lower end thereof, and an outlet member positioned adjacent said outlet port of said hopper, said outlet member being movable and having opening means through which material can flow from the outlet port in said hopper to said spreading member, a masking member movably mounted adjacent said outlet member, said masking member including adjusting means to set same in any one of a plurality of settings relative to said outlet member to open and close said opening means, said outlet member and said masking member being supported by fastening means associated with said shaft and said fastening means being secured to the bottom of said hopper.

2. An implement as claimed in claim 1, wherein said shaft is journalled in a ball bearing secured by a fastening ring to the lower side of the bottom of said hopper.

3. An implement as claimed in claim 2, wherein a disc is spaced above the upper surface of the bottom of said hopper, said disc being movable with the spreading member.

4. An implement as claimed in claim 3, wherein the spreading member has a base plate to which a plurality of ejecting blades are fastened, a central region of the plate being downwardly dished with respect to the remainder thereof.

5. An implement as claimed in claim 4, wherein at least part of said fastening ring is located in the downwardly dished region of said base plate of the spreading member.

6. An implement as claimed in claim 1, wherein said hopper is of inverted frusto-conical configuration, said outlet port being formed in the curved wall of the hopper towards the lowermost end thereof and said outlet member is provided having a frusto-conical wall portion embracing the portion of said wall of the hopper having said outlet port.

7. An implement as claimed in claim 6, wherein said outlet port in the hopper wall subtends an angle of about 180° at the central axis of symmetry of said hopper.

8. An implement as claimed in claim 6, wherein the frusto-conical wall portion of the outlet member is formed with at least one outlet port of right-angled triangular configuration.

9. An implement as claimed in claim 8, wherein said outlet member has an adjusting arm movable along a guide carried by said hopper, means provided for securing said adjusting arm at any chosen setting along said guide.

10. A spreader implement comprising a frame and a hopper with a bottom mounted on said frame, a rotatable spreading member entirely supported by the bottom of said hopper, a stiffening plate mounted to reinforce at least part of said hopper, said plate being connected to said frame, said frame including beams with which said implement can be fastened to the three point lifting device of a tractor, said spreading member deriving its sole support from the bottom of said hopper by being connected to a shaft which is rotatably mounted in the bottom of said hopper, said shaft being fastened to said bottom by a fastening ring having bearing means for receiving said shaft, an outlet member with opening means and an overlying masking member positioned beneath the bottom of said hopper for controlling the discharge of material from an outlet port of said hopper to said spreading member, said fastening ring having a portion for receiving and supporting said outlet member and said masking member, said outlet member being coupled with setting means to retain said opening means in any one of a plurality of settings relative to said outlet port, said setting means being in cooperative association with adjusting means connected to said masking member, whereby said masking member can be secured relative to the opening means of said outlet member in any one of a plurality of settings.

11. A spreader implement with a frame and a hopper with a bottom mounted on said frame, a rotatable spreading member supported adjacent the bottom of said frame, said spreading member being entirely supported by the bottom of said hopper, said spreading member being fastened to a shaft rotatably mounted in the bottom of said hopper, said shaft being substantially vertical positioned to extend up through the lower end of said hopper, a disc plate spaced above the bottom of said hopper, said plate being fastened to the upper end of said shaft, an outlet port in the lower portion of said hopper and an outlet member adjacent said outlet port, said outlet member having opening means through which material can be directed from the hopper to said member, a masking member mounted adjacent said outlet member, said masking member being connected to adjusting means and retainable in any one of a plurality of settings relative to the opening means of said outlet member, said outlet member and said masking member being rotatably supported in a bearing included in a fastening ring, said fastening ring being connected to the bottom of said hopper.

12. A spreader implement comprising a frame and a hopper mounted on said frame, said frame being provided with connecting means for connecting the implement to the three-point lifting device of a tractor, a rotatable spreading member supported by a shaft mounted to extend through the bottom of said hopper, said shaft having connecting means to be connected with driving means for rotating said spreading member, a disc plate mounted on the upper portion of said shaft, said plate being spaced above the bottom of said hopper, an outlet port in the lower wall of said hopper and a masking member positioned adjacent said outlet port, adjusting means coupled with said masking member for setting said masking member in any one of a plurality of settings relative to said hopper, said plate being of generally circular configuration and extending from said shaft to the wall portion of said hopper, the bottom of said hopper being circular in configuration and said outlet port being located adjacent the bottom of said hopper.

13. A spreading implement with a frame and a hopper mounted on said frame, a rotatable spreading member being supported at the bottom of said hopper, said spreading member comprising plate means with a plurality of ejecting blades mounted thereon, a central region of said plate means being downwardly dished with respect to the remainder thereof, a part of said plate means surrounding the central region thereof being of corrugated configuration, the lines of corrugations extending substantially radially outwardly from said central region.

14. An implement as claimed in claim 13, wherein that part of said plates means which surround the central region is comprised of a plurality of relatively inclined segments arranged whereby, with respect to the intended direction of rotation of the spreading member, said segments are inclined downwardly and forwardly from the leading side of each ejecting blade and upwardly and rearwardly behind part of each ejecting blade, there being two segments between each neighbouring pair of ejecting blades which segments, when seen in plan view, have a common straight outer edge.

15. An implement as claimed in claim 14, wherein each ejecting blade is mounted on one segment which has a radially disposed side adjoining a similar side of a neighbouring segment, said junction being located at a higher level than the junction of a second radial side of said segment with a second neighbouring segment.

16. An implement as claimed in claim 14, wherein, when seen in plan view, each ejecting blade is cured to have an outer end extending substantially radially of said plate means along a radial edge of one of said segments, the inner end of each blade being inclined forwardly with respect to the intended direction of rotation of the spreading member.

17. An implement as claimed in claim 15, wherein an ejecting blade is secured to alternative segments of said plate means.

18. A spreader implement comprising a frame and a hopper mounted on said frame, said frame being provided with connecting means for connecting the implement to the three-point lifting device of a tractor, a rotatable spreading member supported by a shaft mounted to extend through the bottom of said hopper and said bottom being circular in configuration, a disc plate mounted on the upper portion of said shaft, said plate being spaced above the bottom of said hopper and being of generally circular configuration to extend from shaft to the wall portion of said hopper, said shaft connecting means to be connected with driving means for rotating said spreading member, an outlet port in the lower wall of said hopper and a masking member positioned adjacent said outlet port, adjusting means coupled with said masking member for setting said masking member in any one of a plurality of settings relative to said hopper whereby the dispensing of material from said hopper can be controlled.

19. An implement as claimed in claim 18, wherein only the hopper is directly secured to the frame, all the other parts of said implement being supported by said hopper.

20. An implement as claimed in claim 19, wherein said hopper has a stiffening plate to which said frame is secured.

21. An implement as claimed in claim 20, wherein said stiffening plate subtends an angle of about 150° at the central axis of symmetry of said hopper.

22. An implement as claimed in claim 21, wherein said frame comprises a substantially horizontal shaft to which strips are secured, said strips extending upwardly from said shaft towards one another and being fastened to said stiffening plate at their uppermost ends.

References Cited

UNITED STATES PATENTS

| | | | |
|---|---|---|---|
| 1,166,477 | 1/1916 | Parrish | 239—665 |
| 2,099,369 | 11/1937 | Lectz | 239—670 |
| 2,726,089 | 12/1955 | Baker | 239—665 |
| 2,992,008 | 7/1961 | Speicher | 239—666 |

FOREIGN PATENTS 423,333    4/1967    Switzerland.

LLOYD L. KING, Primary Examiner

U.S. Cl. X.R.

239—668, 670